INVENTOR
Edward B. McMillan

United States Patent Office 2,822,539
Patented Feb. 4, 1958

2,822,539

MICROWAVE RADIATION ABSORBERS

Edward B. McMillan, Ipswich, Mass.

Application June 6, 1952, Serial No. 292,089

19 Claims. (Cl. 343—18)

The present invention relates to an absorption device, and more particularly to a microwave radiation absorber.

In the prior art, microwave-radiation absorbers have been devised and used to absorb incident microwave-radiation energy without substantial reflection or transmission. Absorbers which have been extremely thin and have had flat surfaces have been relatively narrow-banded, that is, absorbent of microwave radiation within a small range of wavelengths only, such as 3.1 to 3.3 centimeters.. Another category of absorber, designed for use over a wide range of wave lengths, has in one case been thick and has presented a jagged surface of cones, wedges, and pyramids, or of conical, wedge-like, and pyramidal holes. Either of these arrangements has been somewhat bulky and in practice is difficult to preserve from damage or dirt. Furthermore, the abrupt path transition for the incident microwave radiation when impinging upon the absorbing medium caused reflection of too much energy which was neither entrapped, absorbed, or cancelled by wave interference. Another type of absorber, which is used over a wide range of wave lengths, has comprised a thick, flat sheeting designed so as to have a progressive decrease of electrical index of refraction from the back surface to the front surface. The accuracy necessary for the construction of this last-mentioned type of absorber has limited its use.

Consequently it is an object of my invention to provide a broad-banded microwave-radiation absorber comprising a sub-surface of sloped absorbing bodies covered by a layer of impedance-matching material having a substantially smooth, uniform outer surface.

Another object of my invention is to provide a broad-banded microwave radiation absorber having on the surfaces of its absorbing bodies an impedance-matching covering material which "squeezes" into a shorter wave length the microwaves incident upon the absorbing bodies in order to reduce the necessary dimensions of said bodies to secure less bulk and a more useful size.

Still another object of my invention is to provide a broad-banded microwave-radiation absorber having on the surfaces of its absorbing bodies an impedance-matching covering material which eliminates the abruptness of the path transition for the wave from air or other external medium to the absorbing bodies, in order to reduce the reflection of unabsorbed energy at the surface of the bodies.

A further object of my invention is to provide a broad-banded microwave-radiation absorber which can be readily manufactured. Other and further objects of the present invention will become apparent subsequently by reference to the descriptions herein and the accompanying drawings.

To attain the above objects, I have invented a microwave-radiation absorber comprising a plurality of covered radiation-absorbing bodies shaped and disposed relative to one another and with respect to the wave front of the incoming radiation to provide that, over a substantial range of angles of incidence of radiation to be absorbed, the greatest proportion of any radiation reflected from the surfaces of the absorbing bodies will impinge upon other surfaces of these bodies, with the result that entrapment and absorption of the energy of the incident wave occurs in these absorbing bodies. Further, according to my invention, I have provided a covering medium which I call "an impedance-matching material," a substance of electrical refractive index intermediate between that of the medium from which the radiation is incident upon my microwave absorber and the electrical index of refraction of the absorbing bodies but not substantially greater than the square root of the latter index. This impedance-matching material is in contact with and covers the surfaces of the absorbing bodies on their sides in the direction toward the incoming radiation so as to reduce their reflectivity, decreasing the required thickness for the absorber by squeezing the length of the incident waves, and providing a protective and, if desired, smooth, flat, easily cleaned outer surface.

*Example 1*

Figure 1:
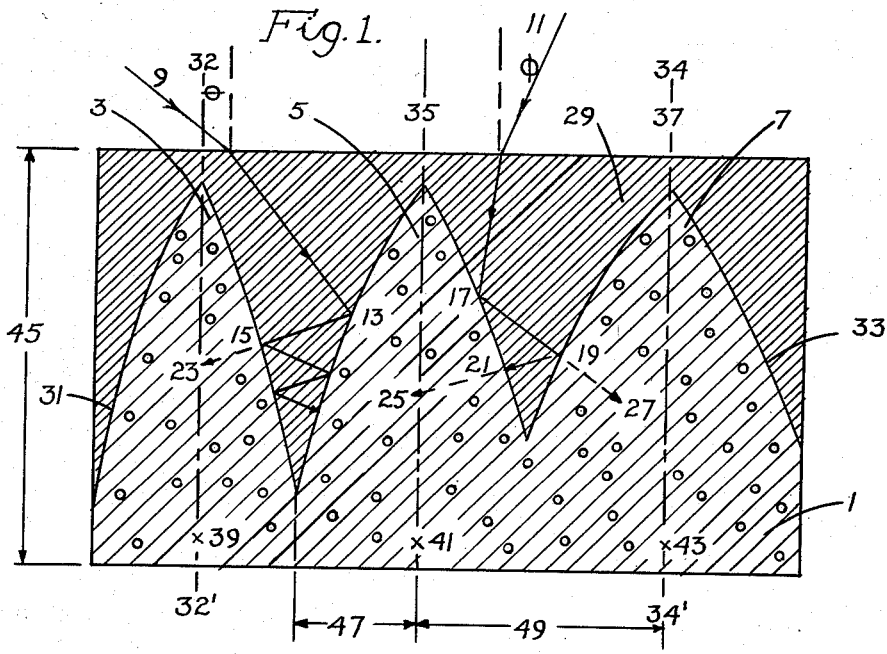
Figure 1 is a transverse sectional view of one form of microwave-radiation absorber constructed in accordance with the present invention.

In Figure 1 is illustrated a compact microwave-radiation absorber according ot my invention, having a substantially smooth, easily cleaned, uniform outer surface. It comprised a covered electrical-energy-absorbing dielectric material 1 having a plurality of absorbing bodies 3, 5, and 7, disposed toward the incoming radiation so that the typical paths 9 and 11 of the geometrical ray direction of a substantial portion of said incident radiation over a substantial range of angles of incidence $\theta$ and $\phi$ lay from one to the other of said bodies, for example in Figure 1, from the point of impingement 13 on body 5 of path 9 to its point of impingement 15 on body 3, and from the point of impingement 17 on body 5 of path 11 to its next point of impingement 19 on body 7, and to its point of impingement 21 on body 5. At many points of impingement, a portion of the radiation shown by arrows 23, 25, and 27 entered said electrical-energy absorbing dielectric material 1 and was absorbed.

The surfaces of said absorbing material 1 were in contact with and covered on their sides in the direction toward the incoming radiation by an impedance-matching material 29, whereby reflection at all covered points of impingement was reduced by eliminating the abruptness of the transition of the wave path from air into the absorbing bodies. The electrical index of refraction of said impedance-matching material did not substantially exceed the square root of the electrical index of refraction of said absorbing material 1, the latter index of refraction being substantially 1.3. The impedance-matching material served to refract the incident waves inward for better entrapment and had an electrical index of refraction equal to 1.05. Since this index was higher than that of air, the waves were squeezed to a smaller size allowing the absorbing bodies to be smaller than would be necessary if they were directly exposed to air.

The electrical index of refraction of electrical-energy-absorbing material 1 was 1.3, and its electrical loss tangent was substantially 0.65. The electrical loss tangent of impedance-matching material 29 was negligible. The cross-section area of that portion of absorbing bodies 3, 5, and 7 nearest to the incident radiation substantially decreased in the direction toward the source of said radiation, said bodies having the shape of ogives, their surfaces having been generated by the revolution of log spiral curves such as 31 and 33 about respective axes such as 32—32' and 34—34'. These ogive-shaped cylindrical absorbing bodies 3, 5, and 7 pointed toward the average direction from which the incident radiation came such that the angle of incidence of rays impinging toward the foci 39, 41, and 43 of said absorbing bodies 3, 5, and 7 was substantially constant, in order to provide more uniform absorption over a range of angles of incidence of said incident radiation than can be obtained with other shapes. In referring to the foci of the absorbing bodies I mean the origins of the radii of curvature of their surfaces. Another advantage of the log spiral curvature was that it directed ray direction paths such as 9 and 11 inward so as to prevent their escape in the direction of the source of said radiation.

The ogive-shaped absorbing bodies 3, 5, and 7 were of random height and diameter but had their peaks at substantially the same level, so that small portions of said radiation which were not trapped and absorbed but escaped in the direction of the sources and receivers of said radiation were reduced in amplitude by wave interference. It will be understood that, while I prefer to make absorbing bodies 3, 5, and 7 ogival in shape, those bodies may be made to have any similar shape capable of minimizing reflection of radiation. The actual dimensions of the microwave absorber of Example 1 were as follows: dimensions 45, 47, and 49 were given average values of 1⅞", ¾", and 1½", respectively. The absorber was constructed in the form of slabs 11⅞" x 17½" x 3½". The electrical-energy-absorbing dielectric material 1 was a polymeric foam composition comprising substantially 1200 grams of phenol-formaldehyde liquid resin, 440 grams of powdered synthetic graphite, and 84 grams of hydrochloric-acid solidification catalyst, and containing gas pockets which I refer to in my description and claims as void spaces. The impedance-matching material 29 was a polymeric foam of polystyrene. On being tested for absorption of microwave radiation, said absorber was found to be excellent for wavelengths between 1 and 5 centimeters at 45, 60, and 70 degrees with respect to the normal. Reflected power was measured to be 40, 37, and 32 decibels, respectively, below the incident power level for parallel and perpendicular polarization of the wave with reference to the plane of incidence.

*Example 2*

The absorbing bodies of my invention may comprise groups of sub-bodies.

Figure 2:
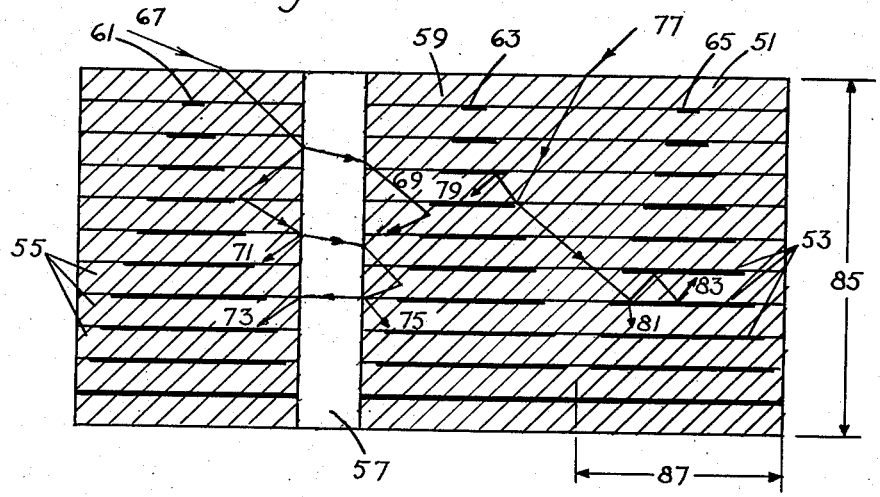
Figure 2 is a transverse sectional view of another embodiment of my invention.

In Figure 2 is illustrated a compact microwave-radiation absorber, according to my invention, which was constructed in laminar form with electrical-energy-absorbing disc-like sub-bodies 53 printed on layers of an impedance-matching material 55 parallel to the outer surface. The absorber also had thin vertical structural supports of wood such as shown at 57, relatively neutral in electrical action, to sustain mechanical loads bearing upon its front outer surface 59. Said discs of electrical-energy-absorbing material 53 were printed with an adhesive paint comprising 50 weight parts of powdered iron from reduction of iron carbonyl, known as corbonyl iron, 50 weight parts of dry, uncured urea-formaldehyde resin containing a dry curing agent, and 40 weight parts of water. Said iron powder was found to be especially effective as an electrical-energy-absorbent conductive particle. The layers of impedance-matching material 55 were cemented together, with the discs of electrical-energy-absorbing material 53 so arranged in diameter and superposition as to form a plurality of cone-shaped absorbing bodies 61, 63, and 65. The electrical index of refraction of these absorbing bodies was substantially the average of the indices of the combined volumes of impedance-matching material 55 and electrical-energy-absorbing material 53 enclosed within said bodies, and had an effective value of 1.6. Incident microwave radiation 67 of wavelengths too great to permit propagation between sub-bodies 53 followed entrapping ray paths 69, 71, 73, and 75 substantially as shown in Figure 2, while incident microwave radiation 77 of wavelengths short enough to permit propagation between sub-bodies 53 followed entrapping ray paths 79, 81, and 83 substantially as shown in Figure 2, all of these ray paths leading to absorption of the energy of the radiation. The impedance-matching material 55 comprised a foam of natural rubber latex, having an electrical index of refraction of 1.1, and reduced the reflection from absorbing bodies 61, 63 and 65. The entire absorber was constructed so as to have a thickness 85 of 4½", and the base of each absorbing body had a diameter 87 of 4". On absorption test before incident microwave radiation at 3.18 centimeters wave length at 45, 60, and 70 degrees angles of incidence with respect to the normal reflection gave power reflections 42, 39, and 34 decibels, respectively, below the incident power level for parallel and perpendicular polarizations of the wave with reference to the plane of incidence. I have also made the absorber laminar normal to the outer surface, rather than parallel thereto, so that absorbing bodies 61, 63, and 65 contained closely spaced sheet-like sub-bodies parallel to the longitudinal axes of said absorbing bodies.

*Example 3*

A compact, broad-banded, microwave-radiation absorber was constructed to cover the wavelength range of 1 to 5 centimeters and was built in the form of slabs to cover the walls of an indoor antenna-test room for the purpose of preventing the reflection of incident radiation from those walls. Each slab was a thin, flat-surfaced block in dimensions 11⅞" x 17½" and 2⅝" thick, having a first medium facing the incident waves comprising an impedance-matching material and having a thin layer of a second medium behind and covered by the first comprising an electrical-energy-absorbing dielectric material. The interface between the two layers possessed a contour having a configuration resembling clustered ogives with their points toward the general direction from which the incident radiation came so that their smallest cross-sectional area lay in that direction. Each interface had the form geometrically generated by the revolution of log spiral curves with their foci near the center of gravity of each ogive. The impedance-matching covering shortened the length of the incident wave, re-directed it down in toward the bases of the ogives, and increased the percentage of energy-absorption by the absorbing bodies. The second and third reflections of incident radiation brought about additional energy-absorption attributable to the increasing slope of the ogival curve toward its base.

All ogives were of the electrical-energy-absorbing dielectric material, and each extended the same distance into the covering impedance-matching material, their tips lying in a plane ¼" under the outermost surface. Each ogive was of 1½" diameter and extended to a base depth of 1⅞" under the surface of the impedance-matching material, and all ogives blended at their broad ends into a common base of this same electrical-energy-absorbing material. Its loss tangent was 0.78. Having an electrical index of refraction of only 1.4, penetration of the incident wave into it was excellent. The impedance matching material had an electrical index of refraction of 1.05 and a negligible loss tangent. The latter material comprised a plastic foam of polystyrene. Other polymeric foams have been successfully employed. The electrical-energy-absorbing material of a batch of ten identical slabs comprised a distinct phase of microwave absorbing substance including 25 pounds 5 ounces of 24-hour-setting Portland cement, 15 pounds 3 ounces of plaster of Paris, 11 pounds 4 ounces of trapped and colloidally and chemically bound water (61 pounds 14 ounces of water before pouring, setting, and drying), mixed with discrete of volumes of matter of lower density comprising 13 pounds 8 ounces of an exploded mica low-density mineral aggregate containing air. Although said proportions are preferred, the composition may be varied within the following ranges: 24-hour-setting Portland cement 20 to 100 weight parts; plaster of Paris 80 to 0 weight parts; trapped, colloidally and chemically bound water 20 to 60 weight parts; exploded mica 0 to 40 weight parts.

For the absorption test, a non-transmitting metal plate was placed flat against the electrical-energy-absorbing material comprising the entire rear surface of the absorbing slab, and the plane-polarized microwave radiation at 3.2 centimeters wave length was directed at several angles of incidence against the flat face of the front of the slab comprising the impedance-matching material. The greatest power reflected at 3.2 centimeters wave length and at 45, 60, and 70 degrees incidence with respect to the normal was measured to be 25, 17, and 14 decibels, respectively, below the incident power level for parallel and perpendicular polarizations of the wave with reference to the plane of incidence. An absorption device comprising a flat backing sheet covered with a surface consisting of a plurality of four-sided pyramids 3" in altitude and 3" across the base and formed of hair matte coated with a mixture of graphite and rubber, the apexes of the pyramids pointing outwards toward the incident wave and all apexes lying in the same plane, was tested for comparison and found to produce under the same test conditions reflections 40, 34, and 24 decibels down at 45, 60, and 70 degrees' incidence respectively.

*Example 4*

A microwave-radiation absorber was constructed substantially identical to the absorber of Example 3 except for the composition and electrical index of refraction of the electrical-energy-absorbing material. The plaster of Paris was entirely replaced with an equal weight of 24-hour setting Portland cement. The resulting electrical-energy-absorbing material had a loss tangent of 0.85 and an electrical index of refraction of 1.5, producing excellent penetration of the incident wave thereinto. On microwave-absorption test, substantially the same results were obtained as for the absorber of Example 3.

*Example 5*

A microwave-radiation absorber was constructed substantially identical to the absorber of Example 3 except for the composition and electrical index of refraction of the electrical-energy-absorbing material. In each 11⅞" x 17½ x 2⅝" absorber slab, the absorbing bodies were poured from a composition comprising a total of 1500 grams of plaster of Paris, 2500 grams of 24-hour-setting Portland cement and 4000 grams of water. The electrical idex of refraction of the set and dried bodies was substantially 2.2. On microwave-absorption test, substantially the same results were obtained as for the microwave absorber of Example 1.

*Example 6*

A microwave-radiation absorber was constructed substantially identical to the absorber of Example 1 except for the composition and electrical index of refraction of the electrical-energy-absorbing material 1. Absorbing material 1 had a loss tangent of 0.62 and a low electrical index of refraction, in this case 1.34. Thus the shape of the absorbing bodies was not critical and did not have to be held to exact dimensions during manufacture. The absorbing material was a polymeric foam composition comprising in each slab substantially 1200 grams of phenol-formaldehyde liquid resin, 350 grams of powdered synthetic graphite, and 84 grams hydrochloric acid as a hardening catalyst. Other useful absorbing-material compositions suitable for coating upon the back surface of the impedance-matching material lie within the range of 100 weight parts of cured phenolic resin and 200 to 600 weight parts of synthetic graphite powder. Absorption test results were substantially the same as for the absorber of Example 1.

*Example 7*

A microwave-radiation absorber was constructed similar to the absorber of Example 1 except that the absorbing material was a polymeric foam composition comprising in each slab substantially 1200 grams of phenol-formaldehyde liquid resin, 1000 grams of powdered carbonyl iron, and 100 grams of acid for curing. Absorption test results were excellent. Other electrically conductive particles have been successfully employed. I have also used non-magnetic powders such as graphite powder, carbon black, aluminum, and copper, finding them acceptable, those named being less satisfactory in the order in which they were named.

*Example 8*

A microwave-radiation absorber was constructed similar to the absorber of Example 1 except that the impedance-matching material 29 was a foam of phenol-formaldehyde resin and absorbing material 1 was a composition of steel wool lightly impregnated with phenol-formaldehyde resin. Absorption test results showed that, at 45° incidence of the impinging radiation, the reflected energy was 22 decibels below the power level of the impinging radiation. Other conductive and semi-conductive fibers have been successfully employed.

The following processes have been used for assembling the structure of the microwave-radiation absorbers of my invention. Holes to receive the electrical-energy-absorbing bodies were in some cases cut and in others heat-impressed into blocks of plastic foam which constituted the impedance-matching material. The electrical-energy-absorbing material was poured into these holes and allowed to solidify as a coating on the interior surfaces of the holes. Another process employed comprised first pouring the electrical-energy-absorbing material into rubber molds shaped in the image of the clustered absorbing bodies. After this matter had solidified, liquid foam-forming material was poured into the surfaces of the absorbing bodies and, on solidifying, became the impedance-matching material.

For the purpose of describing my invention, certain specific embodiments and materials have been illustrated, but it is to be understood that the invention is not to be limited thereto, since it is evident that such other embodimens and materials are contemplated as are within the spirit and scope of the invention.

What I claim is:

1. A microwave-radiation absorber comprising a subsurface of sloped radiation-absorbing bodies of electrical-energy-absorbing dielectric material, said bodies sloping toward the direction of the source of incoming radiation, the angles of slope of surfaces of said bodies toward said direction of source of radiation being selected to divert reflected waves away from the source of said radiation, and an outer surface of impedance-matching material surrounding said bodies and presenting a surface into which the radiation enters more easily than into said bodies, whereby the reflectivity of said radiation-absorbing bodies is reduced.

2. A microwave-radiation absorber comprising a subsurface of sloped radiation-absorbing bodies of electrical-energy-absorbing dielectric material, said bodies sloping toward the direction of source of incoming radiation, the angles of slope of surfaces of said bodies toward said direction of source of radiation being selected to divert reflected waves away from the source of said radiation, and an outer surface of impedance-matching material surrounding said bodies and presenting a surface into which the radiation enters more easily than into said bodies, said impedance-matching material having an electrical index of refraction higher than that of the medium from which the radiation is incident, but not substantially greater than the square root of the electrical index of refraction of the material of said radiation-absorbing bodies, whereby the reflectivity of said radiation-absorbing bodies is reduced.

3. A microwave-radiation absorber comprising a subsurface of sloped radiation-absorbing bodies of electrical-energy-absorbing dielectric material, said bodies sloping toward the direction of source of incoming radiation, the angles of slope of surfaces of said bodies toward said direction of source of radiation being selected to divert reflected waves away from the source of said radiation, and an outer surface of impedance-matching material surrounding said bodies and presenting a surface into which the radiation enters more easily than into said bodies, said impedance-matching material having a flat surface and an electrical index of refraction higher than that of the medium from which the radiation is incident, but not substantially greater than the square root of the electrical index of refraction of the material of said radiation-absorbing bodies, whereby the reflectivity of said radiation-absorbing bodies is reduced.

4. A microwave-radiation absorber having a thickness in the material greater than fifty per cent of the wavelength of said radiation, said absorber comprising a plurality of radiation-absorbing bodies composed of an electrical-energy-absorbing dielectric material of loss tangent substantially in excess of 0.3 and average electrical refractive index substantially less than 2.2, said absorbing bodies being disposed relative to one another and with respect to the wave front of said incoming radiation to provide that over a substantial range of angles of incidence of radiation to be absorbed, the greatest proportion of any radiation reflected from the surfaces of said bodies will impinge upon other surfaces of said bodies and said absorbing bodies being shaped to provide that the area presented to the incident radiation of the portions of said absorbing bodies nearest to said radiation substantially decreases in the direction toward said wave front whereby entrapment and absorption of the energy of the incident wave in said absorbing bodies occurs; an impedance-matching material having a flat surface covering the surfaces of said absorbing bodies on their sides in the direction toward the incoming radiation, said impedance-matching material having an electrical index of refraction higher than that of the medium from which the radiation is incident, but not substantially greater than the square root of the electrical index of refraction of said absorbing bodies, whereby the reflectivity of said absorbing surfaces is reduced.

5. The microwave-radiation absorber of claim 4 in which said radiation-absorbing bodies disposed toward said incident radiation are of random distribution in the direction transverse to the path of said incident radiation, whereby portions of said radiation which have not been trapped and absorbed are reduced in amplitude by wave interference.

6. The microwave-radiation absorber of claim 2 in which the radiation-absorbing bodies have effective contours of substantially the shape and orientation of surfaces generated by the revolution of log spiral curves with their axes of revolution disposed toward the average direction of the incident radiation, whereby the angles of incidence of rays impinging toward the focus of said log spiral curves are substantially constant.

7. The microwave-radiation absorber of claim 6 in which said radiation-absorbing bodies pointing toward the average direction of said incident radiation are of random diameter whereby portions of said radiation which have not been trapped and absorbed are reduced in amplitude by wave interference.

8. A microwave-radiation absorber comprising a subsurface of sloped radiation-absorbing bodies of electrical-energy-absorbing dielectric material, said bodies sloping toward the direction of source of incoming radiation, the angles of slope of surfaces of said bodies toward said direction of source of radiation being selected to divert reflected waves away from the source of said radiation, an outer surface of impedance-matching material surrounding said bodies and presenting a surface into which the radiation enters more easily than into said bodies, whereby the reflectivity of said radiation-absorbing bodies is reduced, and a structural grid comprising thin strips of supporting material disposed edge on toward the average direction of source of said radiation surrounding portions of said absorber, whereby mechanical support is obtained for loads at the outer surface and excessive reflections are avoided.

9. The microwave-radiation absorber of claim 4 in which said electrical-energy-absorbing dielectric material comprises a distinct phase of microwave-absorbing material mixed with volumes of matter of lower density, whereby the weight of said absorber is reduced.

10. The microwave-radiation absorber of claim 9 in which said distinct phase of microwave-absorbing material comprises a polymeric composition filled wtih electrically conductive particles and in which said volumes of matter of lower density comprise void spaces.

11. The microwave-radiation absorber of claim 9 in which said distinct phase of microwave-absorbing material comprises 100 weight parts of acid-cured phenolic resin filled with 200 to 600 weight parts of snythetic graphite powder and in which said volumes of matter of lower density comprise void spaces.

12. The microwave-radiation absorber of claim 4 in which said electrical-energy-absorbing dielectric material comprises a distinct phase of microwave-absorbing material comprising an inorganic cement and volumes of matter of lower density comprising a porous low-density mineral aggregate.

13. The microwave-radiation absorber of claim 12 in which said distinct phase of microwave-absorbing material comprises 20 to 100 weight parts of 24-hour-setting Portland cement, 80 to 0 weight parts of plaster of Paris, and 20 to 60 weight parts of trapped, colloidally and chemically bound water, and in which said volumes of matter of lower density comprise 0 to 40 weight parts of exploded mica.

14. The microwave-radiation absorber of claim 4 in which said electrical-energy-absorbing material comprises a discrete phase of electrically conductive fibers separated by volumes of gas.

15. The microwave-radiation absorber of claim 4 in which said impedance-matching covering material is a foam of a polymeric composition.

16. The microwave-radiation absorber of claim 4 in which said impedance-matching covering material is a foam of polystyrene.

17. A microwave-radiation absorber having a thickness in the material greater than fifty percent of the wavelength of said radiation, said absorber comprising a plurality of radiation-absorbing bodies composed of an electrical-energy-absorbing dielectric material, said absorbing bodies being disposed relative to one another and with respect to the wave front of said incoming radiation to provide that over a substantial range of angles of incidence of radiation to be absorbed, the greatest proportion of any radiation reflected from the surfaces of said bodies will impinge upon other surfaces of said bodies and said absorbing bodies being shaped to provide that the area presented to the incident radiation of the portions of said absorbing bodies nearest to said radiation substantially decreases in the direction toward said wave front whereby entrapment and absorption of the energy of the incident wave in said absorbing bodies occurs; an impedance-matching material covering the surfaces of said absorbing bodies on their sides in the direction toward the source of incoming radiation, said impedance-matching material having a flat surface having an electrical index of refraction higher than that of the medium from which the radiation is incident, but not substantially greater than the square root of the electrical index of refraction of said absorbing bodies, whereby the reflectivity of said absorbing surfaces is reduced.

18. A microwave-radiation absorber having a thickness greater than fifty percent of the wavelength of said radiation, said absorber comprising a plurality of radiation-absorbing bodies composed of an electrical-energy-absorbing dielectric material of loss tangent substantially in excess of 0.3 and average electrical refractive index substantially less than 2.2, said electrical-energy-absorbing dielectric material comprising a distinct phase of microwave-absorbing material mixed with volumes of matter of lower density, said absorbing bodies being disposed relative to one another and with respect to the wave front of said incoming radiation to provide that over a substantial range of angles of incidence of radiation to be absorbed, the greatest proportion of any radiation deflected from the surfaces of said bodies will impinge upon other surfaces of said bodies and said absorbing bodies being shaped to provide that the area presented to the incident radiation of the portions of said absorbing bodies nearest to said radiation substantially decreases in the direction toward said wavefront whereby entrapment and absorption of the energy of the incident wave in said absorbing bodies occurs, an outer surface of impedance-matching material covering the surfaces of said absorbing bodies on their sides in the direction toward the source of incoming radiation, said impedance-matching material being a foam of a polymeric composition and having an electrical index of refraction higher than that of the medium from which the radiation is incident but not substantially greater than the square root of the electrical index of refraction of said absorbing bodies, whereby reflectivity of said absorbing surfaces is reduced, and a structural grid comprising thin strips of supporting material disposed edge on toward the average source direction of said radiation, said grid surrounding portions of said absorber whereby mechanical support is obtained for loads at the outer surface and excessive reflections are avoided.

19. The microwave absorber of claim 16 in which the electrical-energy-absorbing dielectric material comprises a polymeric composition filled with electrically conductive particles.

References Cited in the file of this patent

UNITED STATES PATENTS

| | | |
|---|---|---|
| 2,464,006 | Tiley | Mar. 8, 1949 |
| 2,527,918 | Collard | Oct. 31, 1950 |
| 2,538,035 | Pickles | Jan. 16, 1951 |
| 2,580,921 | Iams | Jan. 1, 1952 |

OTHER REFERENCES

De Mott: Abstract of application Ser. No. 769,710, published December 23, 1952, 665 O. G., 1314.

UNITED STATES PATENT OFFICE
CERTIFICATE OF CORRECTION

Patent No. 2,822,539                                                    February 4, 1958

Edward B. McMillan

It is hereby certified that error appears in the printed specification of the above numbered patent requiring correction and that the said Letters Patent should read as corrected below.

Column 5, line 27, for "40, 34, and 24" read -- 20, 17, and 12 --.

Signed and sealed this 27th day of January 1959.

(SEAL)

Attest:

KARL H. AXLINE
Attesting Officer

ROBERT C. WATSON
                                                                        Commissioner of Patents